INVENTOR.
ROBERT C. NITSCHKE
BY John Morton
HIS ATTORNEY

Nov. 7, 1961  R. C. NITSCHKE  3,007,374
WORKHOLDING FIXTURE FOR GEAR CUTTING MACHINES
Filed Dec. 13, 1957  5 Sheets-Sheet 3
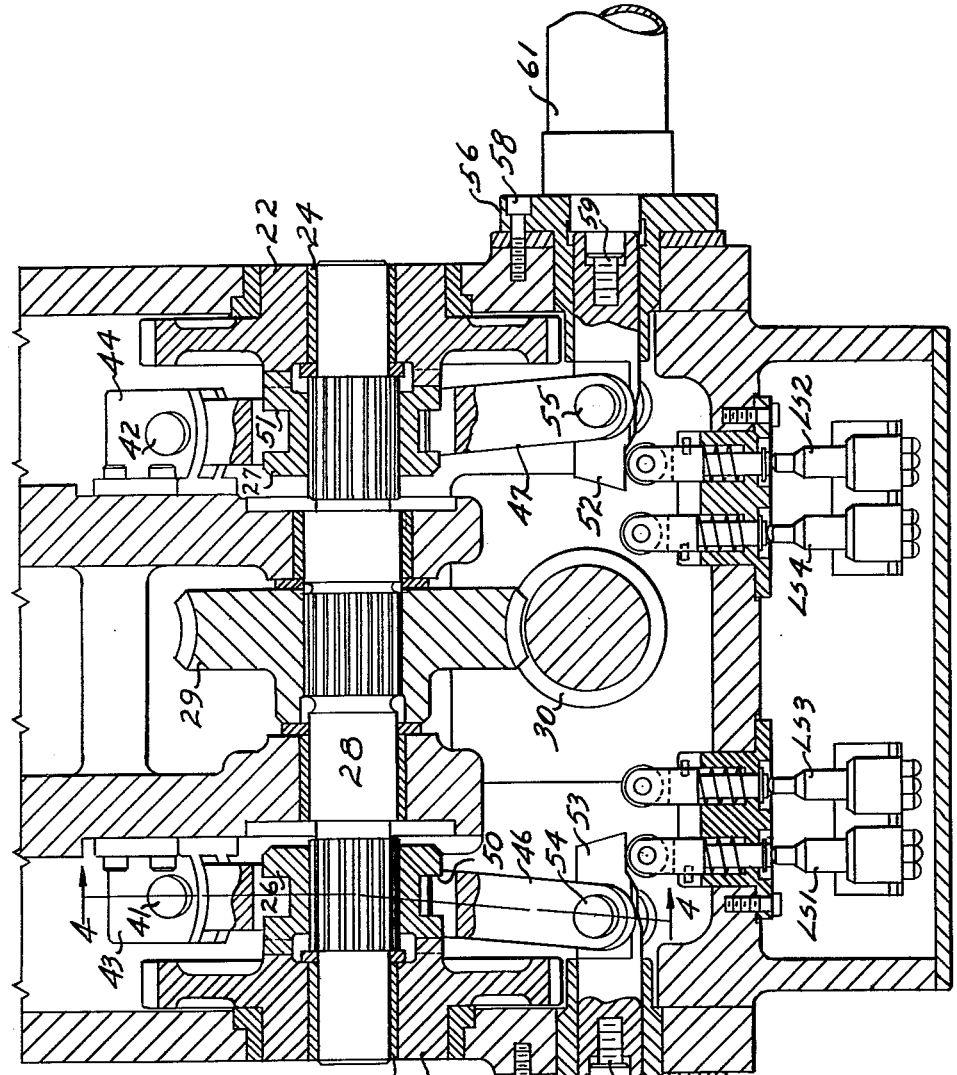
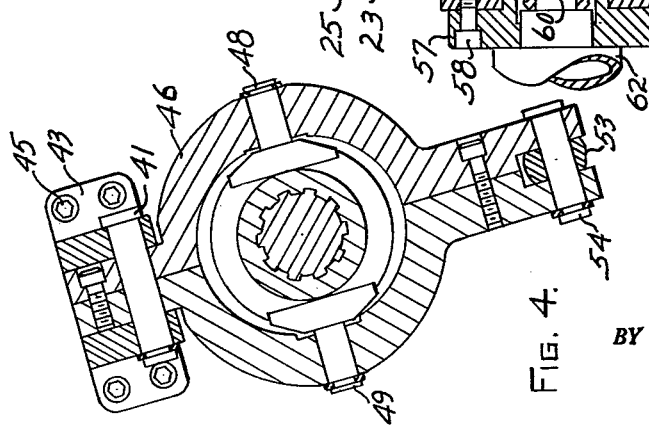
INVENTOR.
ROBERT C. NITSCHKE
BY
HIS ATTORNEY INVENTOR.
ROBERT C. NITSCHKE
BY John Morton
HIS ATTORNEY United States Patent Office 3,007,374
Patented Nov. 7, 1961

3,007,374
WORKHOLDING FIXTURE FOR GEAR CUTTING MACHINES
Robert C. Nitschke, Springfield, Vt., assignor to The Fellows Gear Shaper Company, Springfield, Vt., a corporation of Vermont
Filed Dec. 13, 1957, Ser. No. 702,600
8 Claims. (Cl. 90—7.5)

The present invention relates to gear shaping machines of the well-known Fellows type. More particularly the present invention is concerned with a fixture for holding work pieces in position while a cutting operation is being effected on the work.

The principal object of the present invention is to provide a device which holds long workpieces between two opposed gear cutters.

Another object of the present invention is to provide a fixture which clamps a long workpiece on each of its ends and holds the piece firmly while a cutting operation is effected to each of its ends.

Another object of the present invention is to provide a device for holding a workpiece so that varied configurations may be shaped on both ends simultaneously.

Another object of the present invention is to provide a device which clamps and unclamps each end of a workpiece in a rapid and efficient manner.

Another object of the present invention is to permit an elongated workpiece to be clamped in a work spindle at two spaced locations so as to obtain a more rigid clamping action. This spaced clamping arrangement also enables two distinct workpieces to be clamped in the same work spindle so as to form both workpieces simultaneously.

FIGURE 3 is a horizontal sectional view taken along the line 3—3 of FIGURE 1 showing the splined drive shaft and clutches which actuate the driven gears that open and close the collets.

FIGURE 4 is a partial sectional view taken on the line 4—4 of FIGURE 3 showing the mechanical construction of one of the clutches.

Figure 5:
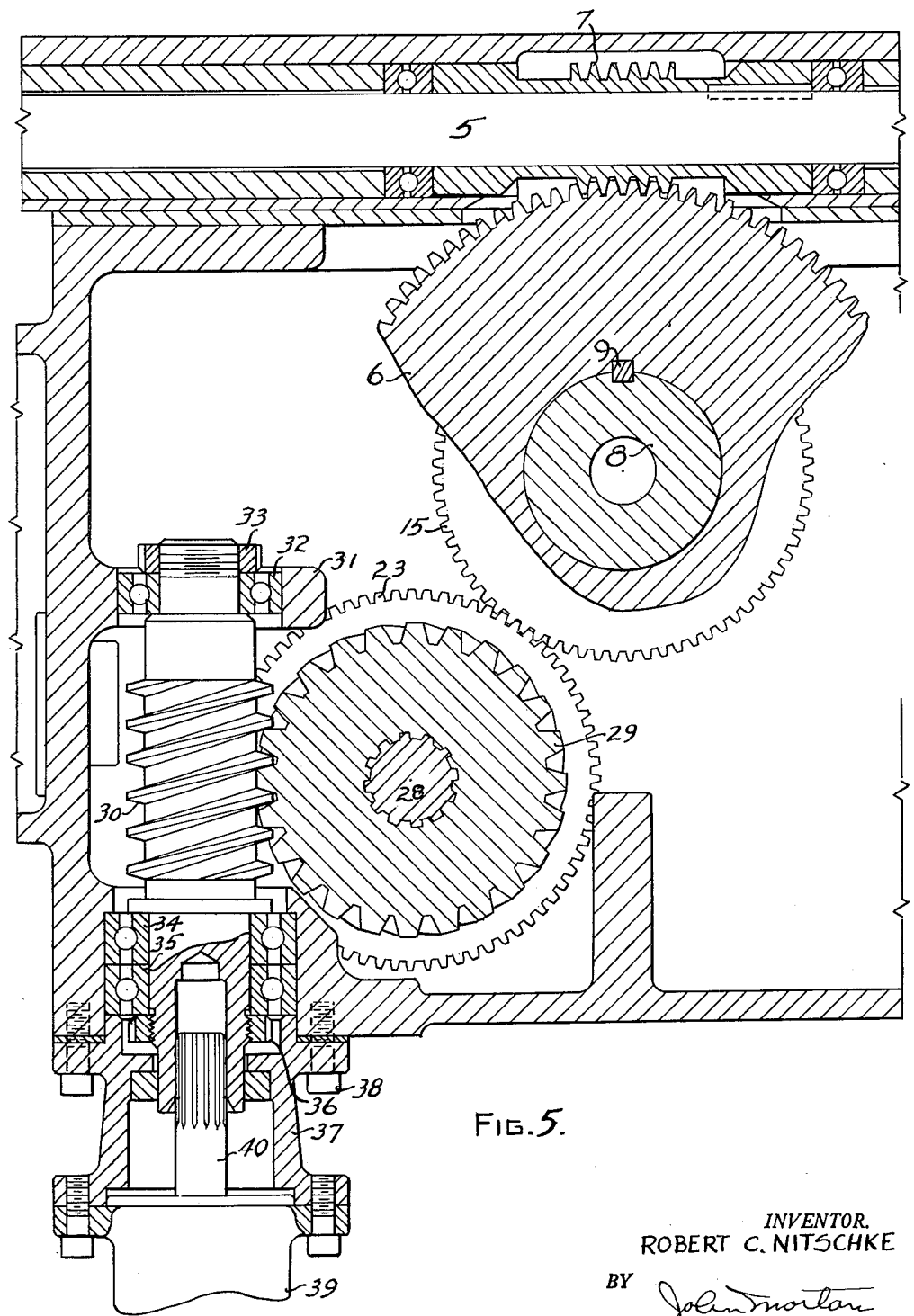
FIGURE 5 is a vertical sectional view of the present invention taken on the line 5—5 of FIGURE 1 which shows the worm and wheel drive which rotates the mechanism of the present embodiment.

FIGURE 5 also shows a conventional gear shaper worm and wheel drive which rotates the work spindle.

Figures 6, 7:
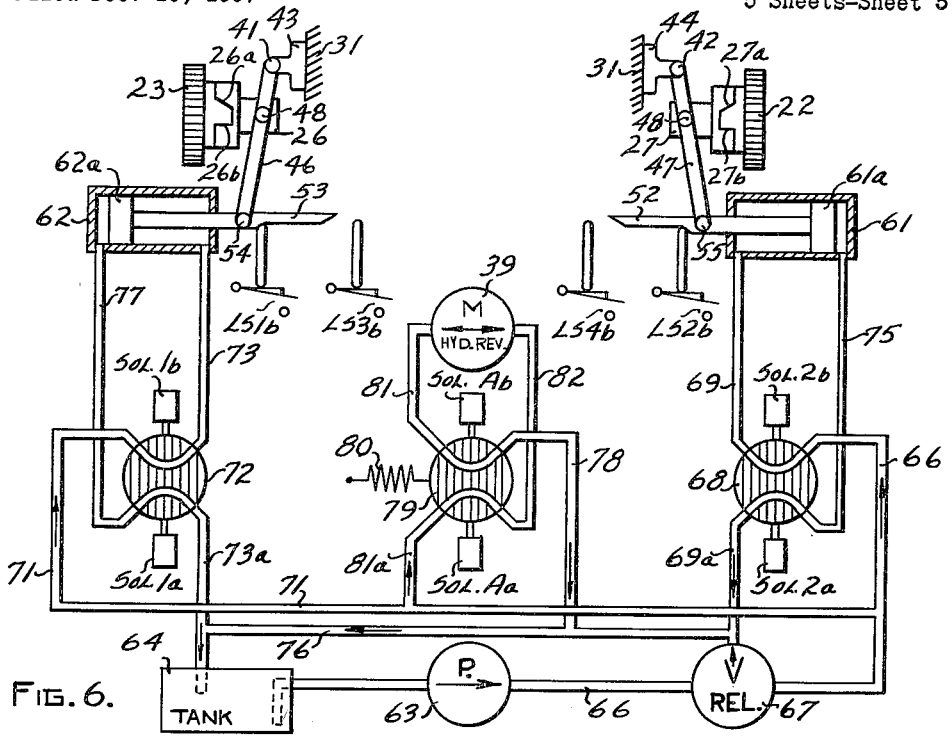

FIGURE 6 shows a typical hydraulic system which can be employed to control the movement of the various machine elements of the present invention.

FIGURE 7 shows a typical electrical control system which can be employed in conjunction with the hydraulic system of FIGURE 6 to obtain the various motions desired in a manner such as known to any person skilled in the art.

Like reference characters designate the same parts wherever shown.

Drive shift 5 (FIGURE 5) derives its rotation from the main machine drive motor (not shown) in the conventional gear shaper manner. Shaft 5 drives worm wheel 6 by means of worm 7 to give the necessary rotation to work spindle 8.

Worm 7 and wheel 6 are a conventional drive for the work spindle of gear shaping machines of the type herein concerned and are similar to the driving worm and wheel shown in Patent 1,463,806, issued August 7, 1923, to E. R. Fellows.

Work spindle 8 in the present embodiment is hollow in structure and is held against rotation relative to wheel 6 by means of a key 9.

In each end of work spindle 8 are mounted collet chucks or collets 10 and 11 (FIGURE 2) for the purpose of clamping each end of a long workpiece W in place prior to a cutting operation which is effected by two opposed cutters C.

These collets are split on their outer ends so as to permit flexure of the various segments and thus to obtain the requisite clamping action.

Mounted on each end of work spindle 8 are collet screws 12 and 13. Collet screws 12 and 13 both have external threads which mesh with mating threads on collet screw driving gears 14 and 15. The threads of collet screw driving gears 14 and 15 and the threads of collet screws 12 and 13 are formed on a complemental lead.

The rotation of collet screw driving gears 14 and 15 will actuate collet screws 12 and 13 in an axial direction toward or away from each other.

Collet screws 12 and 13 contain inner tapered faces 16 and 17 respectively constituting shoulders which mate with like tapered faces on each of the collets. When enough axial movement toward each other is applied to the collet screws 12 and 13 by the rotation of collet screw drive gears 14 and 15 the tapered portions of collet screws 12 and 13 will slide against the like tapered portions of collets 10 and 11.

As the collets are moved axially minute amounts the segments will be contracted or expanded to clamp or unclamp the work. In order to hold collet screws 12 and 13 against rotation relative to the collet chucks two keys 18 and 19 are provided in each end of work spindle 8 and held thereon by screws 20 and 21.

The purpose of keys 18 and 19 is to prevent collet screws 12 and 13 from any relative rotation which would loosen the clamping position of the collets on a workpiece when spindle 8 is rotating during a cutting operation. Also the keys 18 and 19 keep the collet screws in alignment when endwise axial movement is imparted to collet screws 12 and 13.

Figure 1:
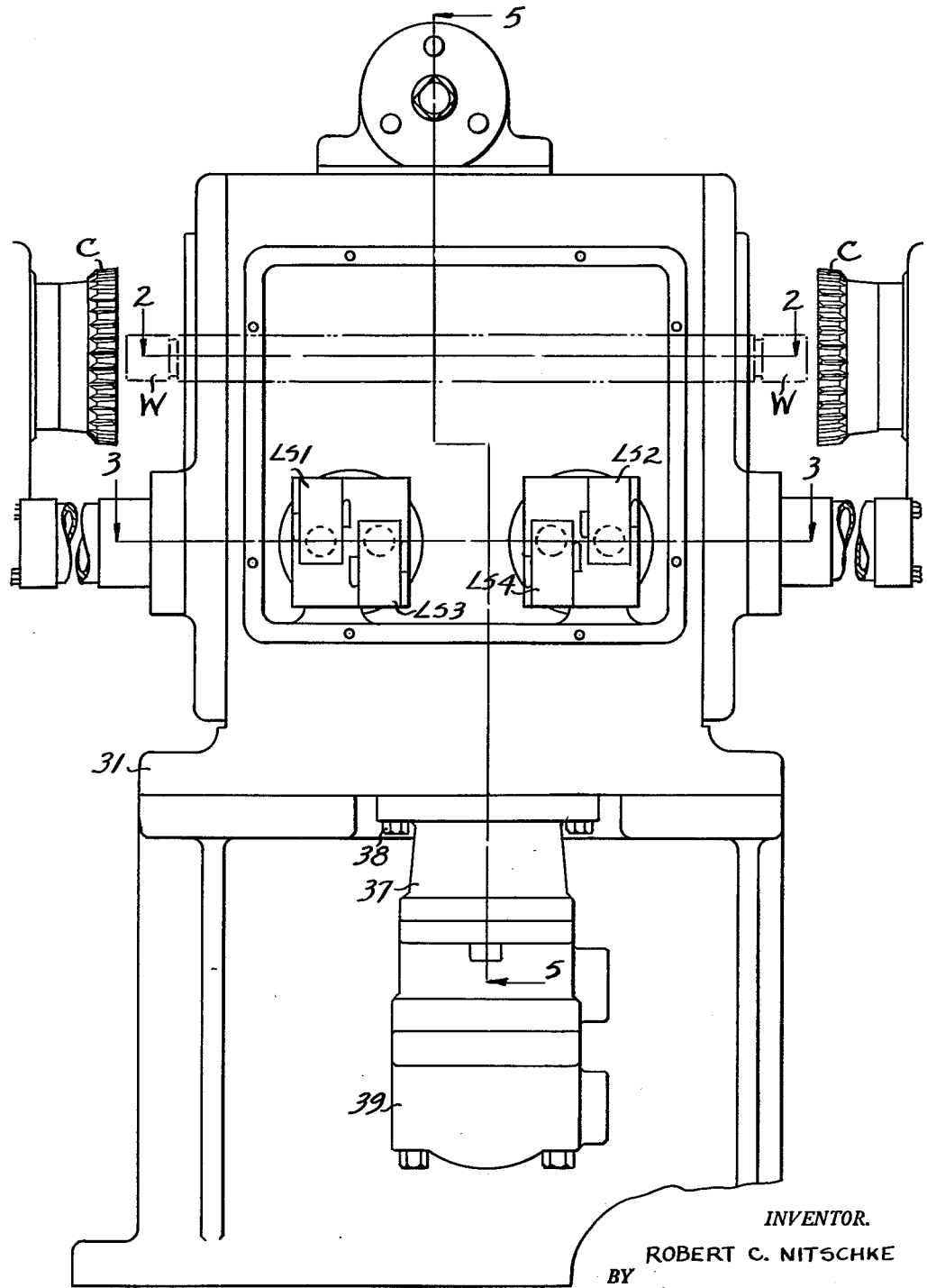
FIGURE 1 is a front elevation of the fixture embodying the present invention and illustrating the horizontal plane in which the work and two opposed cutters are disposed.
Figure 2:
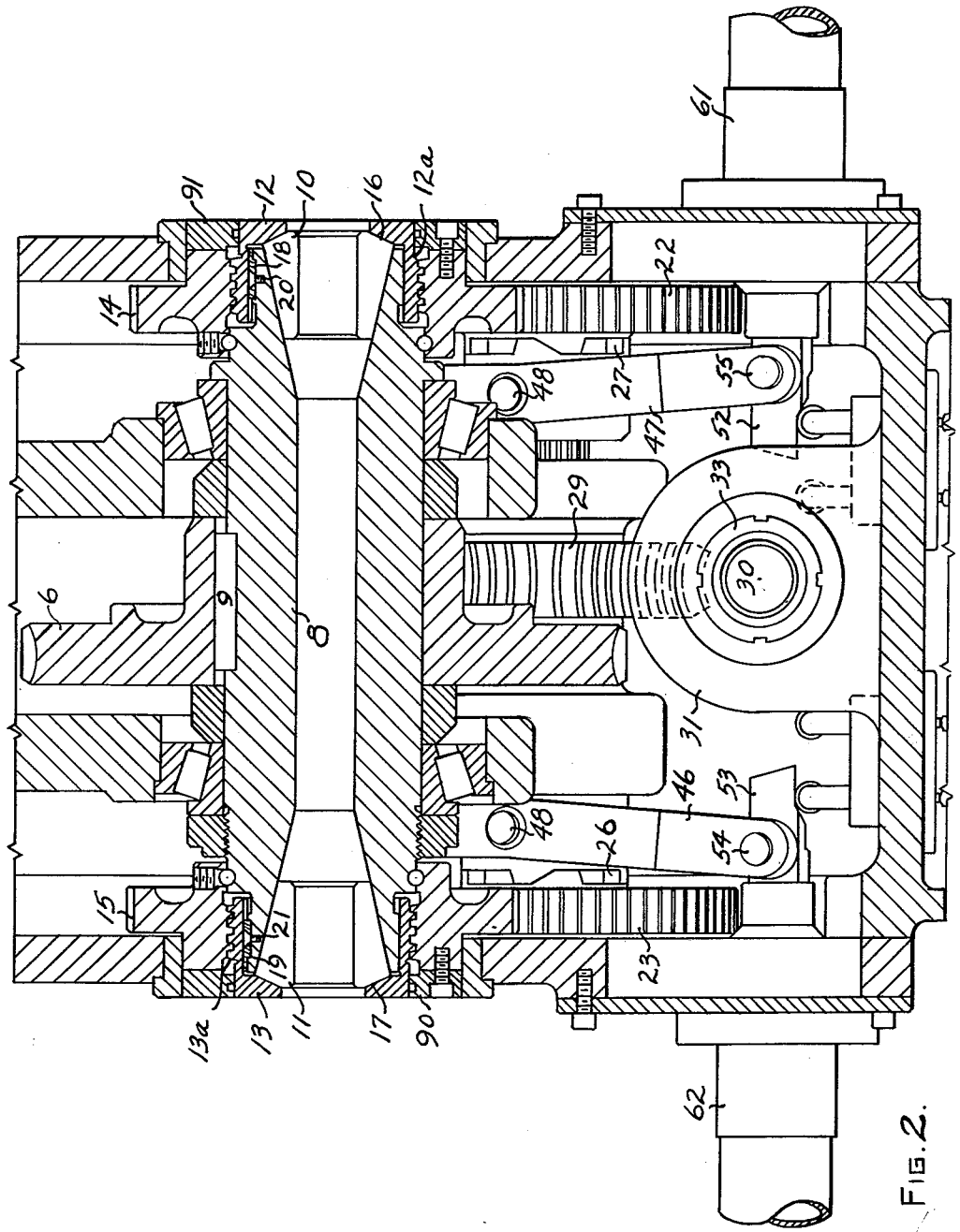
FIGURE 2 is a horizontal sectional view taken along the line 2—2 of FIGURE 1 and showing the two opposed clamping collets and the driven mechanism for opening and closing the collets.

Collet screw drive gears 14 and 15 are driven by gears 22 and 23 (FIGURE 2).

Gears 22 and 23 (FIGURE 3) are mounted on bearings 24 and 25.

Two clutches 26 and 27 are provided with tapered portions 26a and 27a (see FIGURE 6) which mesh with complemental tapered portions on driving gears 22 and 23. These clutches also have vertical surfaces 26b and 27b thereon for a purpose later to be described.

It will be readily apparent that when clutches 26 and 27 are disengaged from gears 22 and 23 that gears 22 and 23 and gears 14 and 15 will cease to drive the already tightened collet screws 12 and 13.

Clutches 26 and 27 are mounted on splined shaft 28 which is journaled in bearings 24 and 25. Shaft 28 is rotated by means of worm wheel gear 29.

As shown more particularly in FIGURE 5, worm wheel 29 is driven by worm 30. The top portion of worm 30 is rotatably held in frame 31 by means of bearing 32 and nut 33.

The bottom portion of worm 30 is also mounted in frame 31 by bearing 34 and 35. A nut 36 is threaded on worm 30 for the purpose of securing the bearings 34 and 35 tightly in place.

A bracket member 37 is secured to frame 31 by a series of bolts 38.

Bracket member 37 carries hydraulic motor 39 which may be of any conventional type. A splined spindle 40 drives the shaft on which worm 30 is integrally formed.

The clutch consists of conventional mechanism with the fulcrum point being pendulum pins 41 and 42. Pins 41 and 42 are carried by two members 43 and 44 (FIGURE 3) which are secured to frame 31 by a series of bolts 45.

Clutch levers 46 and 47 are similarly constructed and contain two identical halves (FIGURE 4) each carrying a shoe 48 and 49. Shoes 48 and 49 ride in grooves 50 and 51 of clutches 26 and 27.

Thus it will be apparent that any motion of clutch levers 46 and 47 about the pins 41 and 42 in a direction longitudinally of splined shaft 28 will cause the shoes 48 and 49 riding in grooves 50 and 51 to bring clutches 27 and 26 either in or out of mesh with gears 23 and 22.

The actuating part of the clutch mechanism consists of cams 53 and 52. Each of these cams are held between the halves of clutch levers 46 and 47 by pins 54 and 55. Cams 53 and 52 are supported in frame 31 by members 57 and 56 and a series of bolts 58.

Cams 53 and 52 are secured to piston plungers 60 and 59 and are actuated by double acting pistons 62a and 61a which are slideable in cylinders 62 and 61.

The pistons 61a and 62a in cylinders 61 and 62 may be activated pneumatically, hydraulically, or by any other suitable means.

Shown in FIGURE 6 is a typical hydraulic system which can be employed to control the movement of the various machine elements of the present invention. This hydraulic system as shown is used in conjunction with an electrical control system such as is shown in FIGURE 7 in a manner well-known to a person skilled in the art.

A pump 63 is provided to keep pressure constantly supplied from supply tank 64 to line 66. A relief valve 67 is provided in line 66 for the purpose of preventing an overload of pressure in the lines of the present system.

As illustrated in FIGURE 6, line 66 conveys pressure through valve 68 to line 69 and then to cylinder 61 to actuate piston 61a.

Line 66 feeds line 71 then through valve 72 to line 73 to cylinder 62 to actuate piston 62a.

Cylinder 61 as presently illustrated exhausts through line 75 and in the present position of valve 68 to exhaust line 76 by means of line 69a.

Cylinder 62 exhausts through line 77 which is connected in the present position of valve 72 to exhaust line 76 by means of 73a.

A branch line 78 is fed from line 71. Line 78 conveys pressure through valve 79 to line 81. Line 81 supplies the necessary pressure to operate hydraulic motor 39 (FIGURES 5 and 6).

Motor 39 exhausts through line 82 and through valve 79 to exhaust line 76 by means of line 81a.

As previously described motor 39 drives splined shaft 28 through worm 30 and wheel 29. It will be apparent that splined shaft 28 is driven for the purpose of rotating clutches 26 and 27 which in turn rotate gears 22 and 23 which in turn rotate gears 14 and 15 to cause collet screws 12 and 13 to travel endwise toward or away from each other to close the collets 10 and 11 tightly on each end of a workpiece, or to loosen collets 10 and 11 to unclamp the work or workpieces mounted in the collets.

The reversed rotation of shaft 28 and the gears driven by same is caused by the reversing of motor 39. When motor 39 is reversed valve 79 which is a standard three-position valve is rotated a quarter of a turn and line 78 is connected with line 82 by this 90° turn of valve 79.

This rotation of valve 79 also connects line 81 to exhaust line 76 through line 81a. The electrical sequences which change valve 79 will be described later. A spring 80 is attached to valve 79 for the purpose of placing valve 79 in a neutral position thus stopping motor 39. This spring 80 becomes effective to actuate valve 79 upon deenergization of solenoids Aa and Ab.

When valve 68 is rotated a quarter of a turn line 66 becomes connected with line 75 and line 69 joins line 69a to exhaust one end of cylinder 61 while lines 66 and 75 convey pressure to the other end of piston 61a.

Likewise when valve 72 is rotated a quarter turn line 71 is connected to line 77 and line 73 becomes connected to exhaust line 73a while lines 71 and 77 convey pressure to the other end of piston 62a.

As pistons 61a and 62a advance they will cause cams 52 and 53 which are fixed thereto to actuate limit switches LS1, LS2, LS3 and LS4 as shown in FIGURES 3 and 6.

The advancement of cams 52 and 53 toward each other will first actuate switches LS2 and LS1 after the collets have been tightened and the rotation of the gears which tightened the collets is discontinued.

Then cams 52 and 53 continue axially toward each other until switches LS3 and LS4 are actuated and an electrical sequence (to be described later) is set up which sends a signal indicating that the commencement of the cutting operation can begin.

When collet screws 12 and 13 travel axially away from each other to loosen their hold on workpiece W a shoulder 12A and 13A provided on collet screws 12 and 13 abuts against retainer rings 90 and 91 thus preventing the collets from loosening any further. At this time the motor 39 will have rotated long enough for a timing relay to time out and stop rotation of motor 39 and to accordingly stop the rotation of shaft 28.

As the collets 10 and 11 become tight on work W the tapered portions 16 and 17 of collet screws 12 and 13 also become tight on collets 10 and 11 and collet screws 12 and 13 stop and cannot travel axially toward each other.

At this time gears 14 and 15 become tight in their meshing relationship with collet screws 12 and 13 and any further rotation tends to be arrested. This tendency to stop also occurs to gears 22 and 23. Then the tapered portions 26a and 27a of clutches 26 and 27 begin to slip off the complemental tapered portions of gears 22 and 23.

This slippage causes a separation of the clutches 26 and 27 away from gears 22 and 23 and the clutches 26 and 27 move in a direction toward each other. This causes the start of the advance of cams 52 and 53 toward each other.

This movement of cams 52 and 53 is caused by clutches 26 and 27 moving out of mesh and urging shoes 48 and 49 to force clutch levers 46 and 47 to swing on pendulum pins 41 and 42. As clutch levers 46 and 47 travel a short distance toward each other they carry cams 52 and 53 in a like direction.

In their movement cams 52 and 53 first contact switches LS1 and LS2. Switches LS1 and LS2 when actuated will energize solenoids 1A and 2A (FIGURE 6) which will turn both valves 72 and 68 a quarter of a turn clockwise to change the flow of pressure in cylinders 61 and 62 to urge pistons 61a and 62a toward each other.

After both solenoids 1A or 2A are energized by means of limit switch LS1 or LS2 a necessary contactor in the electrical control circuit (described below) is broken. The breaking of this contactor deenergizes solenoid Aa in valve 79 and spring 80 rotates valve 79 to an inoperative position whereby exhaust from or flow of pressure to motor 39 stops. Motor 39 therefore stops and accordingly so does the rotation of splined shaft 28 and clutches 26 and 27.

As cams 52 and 53 continue to advance as pressure is applied to pistons 61a and 62a to urge them toward each other they contact limit switches LS3 and LS4. When these switches are both energized contactors are closed in the electrical control system which sends a signal to the machine or operator which indicates that the collets are tight, the clutches have become disengaged, and that now the cutting can start on each end of the workpiece or pieces.

While the cutting is being effected on each end the work pump 63 is constantly supplying pressure to cylinders 61 and 62, pistons 61a and 62a have traveled toward each other to the limit of their movement and are held in this advanced position until the cutting of the workpiece or workpieces is finished.

After the cutting is finished another automatic or manually operated signal is given and electrical sequences occur which cause a mechanical unclamping of collets 10 and 11 so that work W may be removed from cutter spindle 8 and a new workpiece inserted therein.

This unclamping is obtained by a source from the electrical control system energizing solenoid A*b* which turns valve 79 to connect line 78 with line 82 and line 81 with exhaust line 76 through line 81a. This change of flow from one side of motor 39 to the other reverses motor 39 which in turn reverses the rotation of splined shaft 28 and clutches 26 and 27 and likewise reverses the direction of rotation of driven gears 22 and 23 and collet screw gears 14 and 15.

This reversed rotation of collet screw gears 14 and 15 causes collet screws 12 and 13 to travel axially away from each other thus releasing the clamping tension of collets 10 and 11 on work W.

At this time solenoids 1*b* and *b* are energized and valves 72 and 68 are rotated another quarter of a turn to the positions shown in FIGURE 6. In valve 72 lines 71 and 73 are connected and likewise line 77 is connected with exhaust line 76 through line 73a thus changing the flow to cylinder 62 to ultimately bring clutch 26 in meshing relationship with gear 23 to unthread collet screw 13 to accomplish the unclamping on the left side of the work.

In valve 68 lines 66 and 69 are connected and line 75 is connected with exhaust line 76 through line 69a to change the direction of pressure applied to piston 61a in cylinder 61 as is shown in FIGURE 6.

With the change of flow to cylinders 61 and 62 pistons 61a and 62a travel axially away from each other and clutch levers 46 and 47 swing on pendulum pins 41 and 42 and clutches 26 and 27 become engaged once again with gears 22 and 23.

It will be noted in FIGURE 6 that clutches 26 and 27 have vertical surfaces 26b and 27b thereon which afford a positive drive and permit rapid engagement of the clutches 26 and 27 with gears 22 and 23 when the direction of rotation is reversed.

Bearing in mind that this time splined shaft 28 and clutches 26 and 27 are rotating in a reversed direction of rotation because of the reversal of motor 39 it will be obvious that gears 22 and 23 and gears 14 and 15 are also rotating in a reversed direction. The effect of which causes collet screws 12 and 13 to travel axially away from each other allowing collets 10 and 11 to become loose on each end of a workpiece or workpieces located in the collets.

When motor 39 has operated long enough for the workpiece to be freed a timing relay automatically deenergizes solenoid A*b* and spring 80 pushes valve 79 into a neutral position thereby stopping the motor 39.

After the workpiece W has been removed from work spindle 8 and a new workpiece W inserted solenoid A*a* becomes energized to rotate valve 79 from a neutral position to the position shown in FIGURE 6 to connect lines 78 and 81 and line 82 with exhaust line 76 through line 81a, hydraulic motor 39 will start rotating again and through the mechanism previously described collet screws 12 and 13 will once again be tightened.

The electrical control diagram as shown in FIGURE 7 is a typical control system which may be employed to cause the necessary sequence of operation to effect the clamping and unclamping operations.

All contactors of like relays bear the same CR number.

T designates the transformer which controls the load from the main power source to the various electrical elements.

F represents a fuse on line L1 which will prevent overloading.

Certain electric elements on the machine which are not relevant to the present invention are not shown such as for example the loading and unloading switches which can be either manually or automatically operated.

When a workpiece is loaded into the work spindle 8 power is supplied to lines L1 and L2 and contactor 7 is actuated either by an automatic or manually operated switch (not shown).

Contactor 7 sets the condition of line L3 ready for contactor 8 to close. Contactor 8 is closed by power when a signal is given from an automatic or manually operated switch on the machine after the work has been properly located in its collets 10 and 11.

With a complete circuit on line L3 between line L1 and line L2 solenoid A*a* is energized. Solenoid A*a* actuates valve 79 from a neutral position to the position shown in FIGURE 6 in which pressure will flow from line 71 through line 78 through valve 79 to line 81 to start motor 39.

While motor 39 is running exhaust pressure is conveyed from motor 39 by line 82 to line 81a to exhaust line 76. Motor 39 drives splined shaft 28 and the necessary gearing to tighten collets 10 and 11 in a manner previously described.

Collets 10 and 11 are actuated slideably and since both function in a similar manner the action of collet 11 only will be described. When collet 11 becomes tightened clutch 26 becomes disengaged from gear 22 thus begins the advance of cam 53.

Cam 53 engages limit switch LS1 which closes contactor LS1*b*. When LS1*b* is closed a complete circuit is obtained for line L4, this energizes the contact coil of CR1, and closes contactors 1 on lines L6 and L10. At the same time contactor 1 opens on line L3. Contactor 1 on line L3 is normally closed but when relay CR1 becomes energized it opens.

When the contact coil of relay CR1 becomes energized solenoid 1*a* becomes energized and rotates valve 72 one quarter of a turn clockwise to convey pressure to the left side of cylinder 62 by means of connecting lines 71 and 77 line 73 to exhaust line 76 through line 73a.

Piston 62a continues to move to the right and cam 53 engages limit switch LS3. Limit switch LS3 closes contactor LS3*b*.

The closing of contactor LS3*b* makes a complete circuit on line L8 and energizes the contact coil of relay CR3.

When the contact coil of relay CR3 becomes energized the contactor 3 on line L10 closes and the contactor 3 on line L16 opens.

As stated above a similar sequence occurs on the right side of the machine. When collet 10 tightens clutch 27 becomes disengaged from gear 23, then begins the advance of cam 52.

Cam 52 engages limit switch LS2 which operates to close contactor LS2*b* on line L5. When LS2*b* is closed a complete circuit is obtained for line L5 and this complete circuit energizes the contact coil of relay CR2.

When the contact coil of relay CR2 becomes energized contactors 2 on lines L7 and L10 close and contactor 2 on line L12 opens. Contactor 2 on line L12 is normally closed but at this time it is opened and the result is that it breaks the circuit on line L3 and thus deenergizes solenoid A*a* which releases valve 79.

Then spring 80 pushes valve 79 to a neutral position thus stopping hydraulic motor 39, this also stops splined shaft 28 and clutch gears 26 and 27 from rotating, and likewise gears 22 and 23 and gears 14 and 15 and collet screws 12 and 13 since they have achieved their purpose of tightening collets 10 and 11 on the work.

When the contact coil of relay CR2 becomes energized the coil of valve 68 which is solenoid 2*a* becomes energized and rotates valve 68 one quarter of a turn clockwise to convey pressure to the right side of cylinder 61 by means of connecting lines 66 and 75 and line 69 to exhaust line 76 through line 69a.

Piston 61a moves farther to the left and cam 52 engages limit switch LS4. Limit switch LS4 closes contactor LS4b on line L9 making a complete circuit on line L9 and energizing the contact coil of relay CR4.

When the contact coil of relay CR4 becomes energized it closes the contactor 4 on line L10 and opens the contactor 4 on line L16.

Both collets 10 and 11 are tightened on each end of the work spindle and the rotation of clutches 26 and 27 and their shaft 28 is stopped and both pistons 61a and 62a have advanced toward each other as far as they can go and they will remain in that position by pressure being constantly supplied by pump 63.

The condition is now ready for the cutting of gears on each end of workpiece W. When contactor 4 on line L10 is closed it is the last contactor necessary to close and complete the circuit on line L10. When this circuit is complete a signal "A" is given to the machine by actuation of an automatic or manually operated switch indicating that the stroking motors can be started and cutting can begin on each end of work W.

When the cutting of gears begin on each end of work W work spindle 8 is rotated by the conventional gear shaper manner through worm wheel 6 and worm 7.

At the end of a cutting operation a signal "B" is given by an automatic or manually operated switch indicating that the cutting is finished. Signal "B" closes its contactor on line L13 thus making a complete circuit on line L13 and energizes the contact coil of relay CR5.

When the coil of relay CR5 becomes energized this closes the contactor 5 on line L14, and opens contactor 5 on line L11. The opening of normally closed contactor 5 on line L11 breaks the circuit to lines L4, L5, L6, L7, L8, L9 and L10. When this occurs the coil of relays CR3, CR4, CR2, and CR1 become deenergized.

The deenergizing of CR3 on line L8 closes contactor 3 on line L16 and opens contactor 3 on line L10. The deenergizing of CR4 on line L9 closes contactor 4 on line L16 and opens contactor 4 on line L10. The deenergizing of CR1 on line L4 closes contactor 1 on line L3 and opens contactors 1 on lines L6 and L10. The deenergizing of CR2 on line L5 closes contactor 2 on line L12 and opens contactors 2 on lines L7 and L10.

With the energizing of the coil of relay CR5 the closing of contactor 5 on line L14 completes the circuit on line L14 and energizes solenoid 1b on line L14 and solenoid 2b on line L15.

Solenoids 1b and 2b turn valves 72 and 68 a quarter of a turn clockwise to the positions as shown in FIGURE 6 whereby pressure is fed to cylinder 62 through lines 71 and 73 to urge position 62a to the left so clutch 26 will become meshed with driven gear 22 to unscrew collet screw 13 in order to unclamp the left side of workpiece W.

Likewise pressure will be fed to cylinder 61 through lines 66 and 69 to urge piston 61a to the right (as seen in FIGURE 6) so that clutch 27 can drive gear 23 to unscrew collet screw 12 to unclamp the right side of workpiece W.

When the coil of relay CR5 becomes energized the closing of contactor 5 on line L14 brings the circuit down line L19 to line L16.

The deenergizing of CR3 on line L8 and CR4 on line L9 closes the contactors 3 and 4 on line L16 thus completing the circuit from line L1 through lines L14 and L15 then through lines L19 and L16 and L17.

With the completion of the circuit on lines L16 and L17 the coil of relay CR6 on line L16 becomes energized and also the coil of timing relay TR1 on line L17 becomes energized.

The energizing of the coil of relay CR6 closes the contactor 6 on line L18 and energizes solenoid Ab. Solenoid Ab turns valve 79 a quarter of a turn to connect line 78 with line 82 and line 81 with exhaust line 76 through line 81a. This reverses the rotation of hydraulic motor 39 and also clutches 26 and 27 and gears 22 and 23 and gears 14 and 15 to unscrew collet screws 12 and 13 to loosen collets 10 and 11.

At this phase of the sequence solenoids 1b and 2b have reversed the flow of oil to cylinders 61 and 62 to the positions shown in FIGURE 6 and pistons 61a and 62a are traveling axially away from each other and solenoid Ab has reversed the rotation of motor 39, which also reverses the direction of rotation of clutches 26 and 27 and gears 22 and 23 and gears 14 and 15 and collet screws 12 and 13.

The pistons 61a and 62a have moved axially away from each other enough to engage clutches 26 and 27 with gears 22 and 23 to unscrew collet screws 12 and 13. The work is unclamped and timing relay TR1 on line L17 times itself out and deenergizes. When timing relay TR1 becomes deenergized its contactor TR1 on line L16 opens.

The breaking of contactor TR1 on line L16 deenergizes the coil of relay CR6. The deenergizing of CR6 opens contactor 6 on line L18. The opening of contactor 6 on line L18 breaks the circuit on line L18 and deenergizes solenoid Ab.

When solenoid Ab becomes deenergized spring 80 (FIGURE 6) neutralizes valve 79 thus stopping the flow and exhaust to hydraulic motor 39. Motor 39 stops and likewise does the rotation of clutches 26 and 27 and collet screws 12 and 13.

The timing relay TR1 is timed to deenergize after collet screws have traveled endwise away from each other enough to release collets 10 and 11 to unclamp workpiece W.

After work W is removed and a new workpiece inserted in spindle 8 a similar mechanical hydraulic and electrical sequence as previously described occurs.

What I claim and desire to secure by Letters Patent is:

1. In a workholder of the character described, a workholding spindle rotatably journalled in said base, means to rotate said workholding spindle, said workholding spindle having tapered openings in each end thereof, a pair of collet chucks having tapered external surfaces complemental to said openings fitted in said openings, means to impart axial movement to said collet chucks whereby said chucks may expand or contract, said last named means consisting of a reversible motor, a gear drive between said motor and said collet chucks, and releasable clutches in said gear drive, and means to actuate said clutches after a predetermined movement has been imparted to said collets to exert a clamping force on work held in said workholding spindle.

2. In a workholder of the character described, a workholding spindle rotatably journalled in said base, means to rotate said workholding spindle, said workholding spindle having tapered openings in each end thereof, a pair of collet chucks having tapered external surfaces complemental to said openings fitted in said openings, means to impart axial movement to said collet chucks whereby said chucks may expand or contract, said last named means consisting of a reversible motor, a gear drive between said motor and said collet chucks, and releasable clutches in said gear drive, said clutches being constructed and arranged so that an initial releasing movement is imparted to said clutches by the torque imposed thereon in response to contraction of said collets upon a workpiece located in said workholding spindle.

3. In a workholder of the character described, a workholding spindle rotatably journalled in said base, means to rotate said workholding spindle, said workholding spindle having tapered openings in each end thereof, a pair of collet chucks having tapered surfaces complemental to said openings fitted in said openings, means to impart axial movement to said collet chucks whereby said chucks may expand or contract, said last named means including a reversible motor, a gear drive between said motor and said collet chucks, and releasable clutches in said gear drive, said clutches being constructed and arranged so that an initial releasing movement is imparted to said clutches by the torque imposed thereon, in response to contraction of said collets upon a workpiece located in said workholding spindle and a second means to impart additional movement to said clutches after a predetermined movement thereof.

4. In a workholder of the character described, a base, a workholding spindle rotatably journalled in said base, means to rotate said workholding spindle, a workholding chuck located in an end of said workholding spindle, means to release and to contract said workholding chuck, said last named means consisting of a reversible driving motor, a shaft journalled in said base extending parallelwise to said workholding spindle, a gear train connecting said motor to said shaft, a releasable clutch interposed between said shaft and said workholding spindle, said clutch being so constructed and arranged so that upon the imposition of a predetermined amount of torque thereon an initial releasing movement will be imparted thereto, and an additional means to impart a further releasing movement to said clutch actuated in response to a predetermined amount of movement of said clutch.

5. In a device of the character described, a base, a workholding spindle, rotatably mounted in said base, means to rotate said workholding spindle, a split collet chuck mounted in one end of said workholding spindle, said chuck having a tapered external surface mating with a similarly formed surface on the end of said work spindle, said tapered surfaces cooperating to expand and contract said chuck in response to axial movement thereof, a collet screw mounted on said work spindle, means to hold said screw against rotative movement relative to said work spindle, a thread formed on the external surface of said screw, a drive gear encircling said collet screw having internal threads thereon intermeshing with the threads formed on said collet screw, a shaft extending parallel to said work spindle journalled in said base, a driving gear mounted on and rotatable with respect to said shaft, said driving gear meshing with said drive gear, a clutch on said shaft to hold said driving gear against rotation relative to said shaft, and means to engage and disengage said clutch.

6. In a device of the character claimed in claim 5 in which said clutch is so constructed that an initial disengaging movement will be imparted thereto by the application of a predetermined amount of torque to said collet screw.

7. In a workholder of the character described, a base, a work spindle rotatably mounted in said base, said work spindle having an axial opening extending throughout its length, means to rotate said work spindle, a split collet mounted in each end of said work spindle, said collets having tapered external surfaces mating with similarly formed surfaces on the ends of said work spindle, means to move said collets axially to expand and contract the same, said last named means including a drive motor, a gear drive interposed between said drive motor and said collets whereby each collet will be concurrently operated upon rotation of said drive motor, said gear drive including a plurality of clutches, one for each of said collets, and means to engage and disengage said clutches, said clutches being constructed and arranged so that an initial disengaging movement is imparted to said clutches upon the imposition of a predetermined amount of torque exerted on said clutches in response to the movement of said collets.

8. In a workholder of the character described, a base, a workholding spindle rotatably journalled in said base, means to rotate said workholding spindle, a workholding chuck located in an end of said workholding spindle, means to release and to contract said workholding chuck, said last named means consisting of a reversible driving motor, a gear train connecting said motor to said workholding spindle, a releasable clutch interposed between said motor and said workholding spindle, said clutch being so constructed and arranged so that upon the imposition of a predetermined amount of torque thereon an initial releasing movement will be imparted thereto, and an additional means to impart a further releasing movement to said clutch actuated in response to a predetermined amount of movement of said clutch.

References Cited in the file of this patent

UNITED STATES PATENTS

| | | |
|---|---|---|
| 1,454,121 | Lavoie | May 8, 1923 |
| 1,604,113 | Drissner et al. | Oct. 26, 1926 |
| 1,750,028 | Sykes | Mar. 11, 1930 |
| 2,473,108 | Meyer et al. | June 14, 1949 |
| 2,608,415 | Drissner | Aug. 26, 1952 |
| 2,628,537 | Miller | Feb. 17, 1953 |
| 2,771,296 | Retz | Nov. 20, 1956 |